United States Patent [19]

Lucca et al.

[11] Patent Number: 4,966,799
[45] Date of Patent: Oct. 30, 1990

[54] NOISE-REDUCING STRUCTURAL ELEMENT

[75] Inventors: Eusebio Lucca, Vercelli, Italy; Paul Rohrer, Herrliberg, Switzerland

[73] Assignee: Matec Holding AG, Kusnacht, Switzerland

[21] Appl. No.: 99,525

[22] Filed: Sep. 22, 1987

[30] Foreign Application Priority Data

Sep. 26, 1986 [CH] Switzerland .................. 73867/86

[51] Int. Cl.$^5$ ............................................. B32B 27/00
[52] U.S. Cl. .................................... 428/95; 181/290;
181/294; 428/172; 428/198; 428/286; 428/287;
428/288; 428/290; 428/319.9
[58] Field of Search ............... 428/198, 286, 287, 288,
428/290, 319.9, 95, 172, 95, 172; 181/290, 294

[56] References Cited

U.S. PATENT DOCUMENTS 4,056,161 11/1977 Allen, Jr. ........................... 264/510
4,131,664 12/1978 Flowers et al. .................... 181/290

FOREIGN PATENT DOCUMENTS 2924197 12/1980 Fed. Rep. of Germany .
2126995 10/1972 France .
2383782 10/1978 France .
2096943 11/1982 United Kingdom .

Primary Examiner—Marion C. McCamish

[57] ABSTRACT

The structural element contains a first sound-absorbing and thermally insulating layer (21) and a second sound-insulating, dimensionally stable supporting layer (23). Preferably, the first layer consists of a thermoformed fibre mat or a foam which is at least partially open-cell, and the second layer consists of a rigid, thermoformed synthetic material, for example a plastic material reinforced with glass fibres. A porous or microporous decorative layer (22) can be applied to the outside of the first layer and a thermoformed car carpet (24) can be applied to the outside of the supporting layer. A heat-sealable adhesive layer (27) can be placed between the two layers, the said adhesive layer incrasing the bond between the two layers.

Because of the dimensionally stable supporting layer, the structural element can be used as a sound screen without a holding frame or as a sound-insulating bodywork part without a supporting surface, which makes it possible to reduce the weight of the overall construction and to make assembly simpler and cheaper.

17 Claims, 1 Drawing Sheet

NOISE-REDUCING STRUCTURAL ELEMENT

The present invention relates to a noise-reducing structural element and a process for its production.

Structural elements which are intended for passive noise control by sound absorption or sound insulation are known in many embodiments. A first group of these structural elements are sound screens, which usually consist of a fibre material or open-cell foam and are suspended in a holding frame in large rooms. A second group comprises all types of encapsulations for noise sources and linings for inner rooms, which likewise predominantly consist of fibre material or open-cell foam and are applied as a coating on a supporting surface or attached, as a sheet-like layer, to a supporting surface.

The majority of the sound screens are flat or only slightly curved structures, the surfaces or outer surfaces of which are not additionally processed, and the encapsulations can simply be composed of such structures. In contrast, linings for inner rooms virtually always have a decorative layer on their visible outer surface, and the lining for vehicle cabins and in particular for automobiles may furthermore have a relief-like shape on the surface intended to be adjacent to the supporting surface of the bodywork over the entire area.

An embodiment of a sound-absorbing and a decorative inner lining for a vehicle bodywork is disclosed in U.S. Pat. No. 4,131,664. This lining consists of two fibre mats having an airtight film in between, one of the fibre mats being compacted and preferably having a relief-like outer surface suitable for lying adjacent, over the entire surface, to the wall to be lined, while a decorative layer can be arranged on the unshaped outer surface of the uncompacted mat. To produce this lining, the two fibre mats, between the fibres of which a fine-particled binder is incorporated, are introduced together with the film in between into a heatable mould. After the mould has been closed, compressed air is passed into the mould cavity through channels in one mould half, which compressed air acts on the airtight film through one of the mats and presses the said film together with the other mat against the relief-like inner wall of the other mould half. After curing of the binder, the lining with an uncompacted layer and a compacted layer having a relief-like shape on its outer surface can be removed from the mould.

None of the sound-absorbing structural elements previously known is dimensionally stable or selfsupporting and can be used without a holding frame or a base or back wall supporting the entire area.

It is the object of the present invention to provide a noise-reducing, decorative structural element which performs its function without a holding frame or supporting wall.

This object is achieved, according to the invention, by a structural element which has at least one first sound-absorbing and thermally insulating layer and a second sound-insulating, dimensionally stable supporting layer, the adjacent surfaces of the said two layers being bonded to one another at least in certain areas.

Because of the dimensionally stable supporting layer, the structural element according to the invention can be used as a sound screen without a holding frame, and also has sufficient compressive strength, flexural strength and resistance to buckling to permit it to be used as a sound-absorbing and sound-insulating bodywork part without a supporting surface, for example in a modern plastic bodywork for motor vehicles, as an engine cover in trucks, for encapsulating machines, etc. This allows the weight of the overall construction to be reduced considerably and assembly to be made significantly simpler and cheaper.

In a preferred process for the production of the structural element according to the invention in a heatable and coolable two-part moulding press and in one operation, the stack consisting of at least two layers is placed in the open moulding press and compressed when the press is closed, and the second layer is pressed against the adjacent mould wall by passing compressed gas into the mould cavity and in the region of the first layer, and the two layers are compacted and bonded permanently to one another by supplying and/or removing heat through the mould parts.

In a preferred embodiment of this process, in order to improve the bond between the two layers, a heat-sealable material is placed between the two layers.

A few embodiments of the structural component according to the invention and the preferred process for their production are described below with the aid of the Figures.

For the sake of greater clarity, the thicknesses of the various layers of the structural element parts shown in the Figures have not been drawn to scale.

Figure 1:
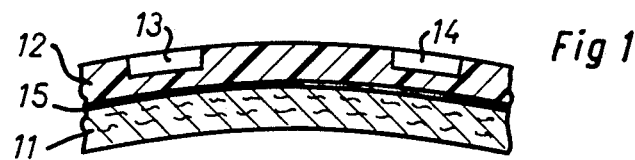
FIG. 1 shows a section through a part of a simple twolayer structural element.

The part of a simple embodiment of the structural element according to the invention, shown schematically and in section in FIG. 1, is slightly curved and contains only two layers, a padding layer 11 and a supporting layer 12. The outer surface of the supporting layer 12 has two recesses 13, 14, which are intended to prevent the structural element from being displaced when it is placed on a structured surface, or for the installation of sunk holding elements. The sound-absorbing and thermally insulating padding layer consists of a porous fibre mat of natural fibres, which are bonded, at the intersections and points of contact, with a fine-particled thermoplastic which has been sprinkled in. The sound-insulating, dimensionally stable supporting layer is a solid sheet of a thermoformable plastic material. The two layers are bonded at least partially to one another during the production process to be described, in a heatable moulding press at an elevated temperature, by softening the material of the layers, at least in the areas in contact with one another. To improve this bond, a heat-sealable film (15) can, if desired, be arranged between the layers.

Figure 2:
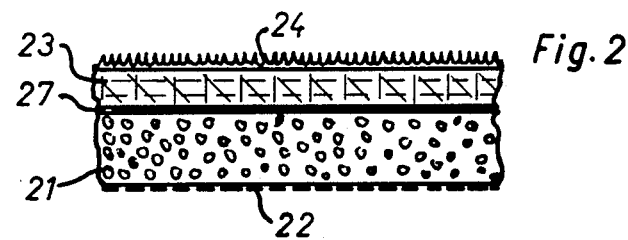
FIG. 2 shows a section through a part of a multilayer structural element.

FIG. 2 shows, likewise schematically, the section through a part of a perfected embodiment of the structural element according to the invention. In this embodiment, the outer surface of the padding layer 21 is covered with a decorative layer 22, and the supporting layer 23 is provided with a carpet 24 on the outer surface. An adhesive layer 27 is placed between the padding layer and the supporting layer. The sound-absorbing and thermally insulating padding layer consists of a fibre mat bonded with a thermoplastic. The supporting layer consists of polypropylene containing a mineral filler and firmly bonded to the carpet. The decorative layer melted onto the outer surface of the padding layer is a microporous, impregnated fleece of synthetic fibres. A thin, heat-sealable film is used as an adhesive layer between the padding layer and the supporting layer.

Figure 3:
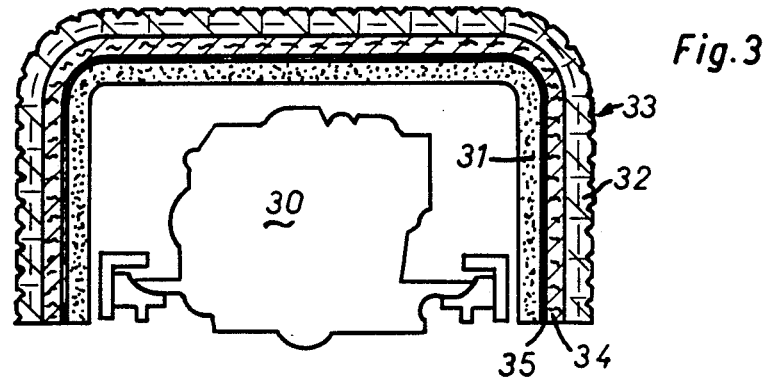
FIG. 3 shows a vertical section through an embodiment intended as an integral engine hood for trucks.

FIG. 3 schematically shows a vertical section through an embodiment which is in the form of an integral engine hood for a truck. The padding layer (31) which faces the noise source, i.e. the engine 30, is shaped from open-cell polyurethane foam and is bonded to a supporting layer by means of an adhesive film (35). The rigid supporting layer consists of a layer of glass fibre-reinforced heat-setting material (32) and a layer of compacted heat-setting fleece of blended fibres (34). The first-mentioned, outer layer has a decorative embossed pattern (33) on its outer surface.

Figure 4:
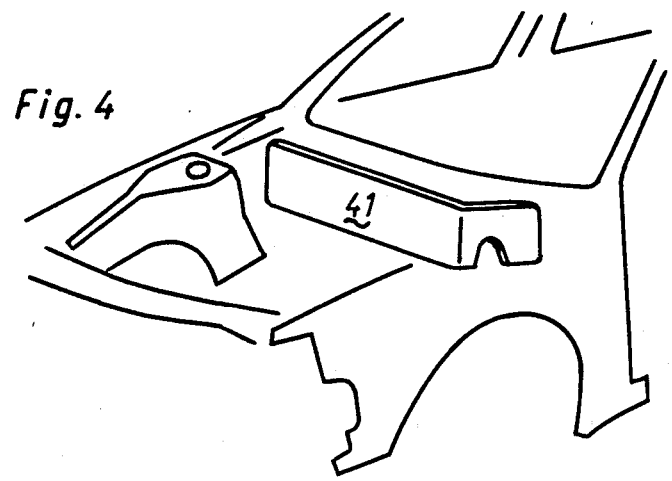
FIG. 4 is a perspective view of an embodiment which is installed as a partition between the engine space and the radiator tank of a car.

FIG. 4 schematically shows the installation of a structural element which is used as a rigid partition (41) and is used instead of a sheet metal wall and a sound-absorbing lining between the engine space and the radiator tank of a car. It is used with the padding layer facing the engine and the supporting layer facing the radiator tank. The padding layer is in the form of a fleece and is rendered water-repellent, oil-repellent and petrol-repellent. The supporting layer consists of vulcanised, synthetic rubber containing mineral filler, is completely impermeable to water and acts as a sound insulator.

The four embodiments of the structural element according to the invention which have been shown and described can of course be modified in many ways and adapted to specific requirements. For example, a structural element which is to be used as a sound screen and needs to have little mechanical stability but good sound absorption should possess a relatively thin supporting layer and a comparatively thick padding layer. On the other hand, a structural element intended as a supporting part of vehicle bodywork should have a relatively thick and, if necessary, multi-stratum supporting layer, whereas the thickness of the padding layer depends on the required sound absorption. In embodiments of the structural element which have been tested in practice, the thickness of the supporting layer is 1-10 mm and that of the padding layer 5-50 mm. Furthermore, heat-sealable materials which are effective adhesives can be placed between the layers or the individual strata of multi-stratum layers, and these materials can be used in the form of a fine-particled powder, a net or a film.

Moreover, the materials used for the sound-absorbing and thermally insulating padding layer and those used for the sound-insulating dimensionally stable supporting layer can be adapted to special requirements or optimised to correspond to the required dimensions or the number of layers. Thus, the fibre mat, which preferably has a low density of 50–150 kg/m$^3$, can consist of natural or synthetic fibres or a mixture of natural or synthetic fibres. For example, a heat-curable phenol resin or urea/formaldehyde or a thermoplastic polyolefin resin can be used as a binder for the fibres. Semipolymerized phenol/formaldehyde resins of the novolac type are particularly advantageous. With the use of bonding fibres, which on heating adhesively bond or fuse together the base fibres of the higher melting material at the points of intersection or contact, it is also possible to dispense with sprinkling in the further binder. The polyurethane foam described can be replaced by any gas-permeable, i.e. at least partially open-cell, thermoformable plastic foam having a typical density of between 20 and 100 kg/m$^3$. A solid sheet of a thermoplastic or heat-setting material can be used for the supporting layer. A mineral filler can be added to thermoplastic material to give densities up to, for example, 1.5 to 2.5 kg/dm$^3$. In order to increase the mechanical strength of the supporting layer, a glass fibre-reinforced thermoplastic material (GMT), for example polyolefin, polyamide, polyester, etc., can be used, in addition to the above-mentioned heat-setting material (SMC) based on unsaturated polyester, epoxide, etc. and reinforced with 5 to 40% by weight of glass fibres. Finally, vulcanisable rubber is also suitable as a supporting layer.

The structural element according to the invention is preferably produced in a single-step compression moulding process. A two-part moulding press is used for this purpose, both parts of the said press being heatable and coolable. One part of the moulding press can have a relief-like structure and at least the other part has a plurality of channels in order to pass compressed air into the mould cavity. One mould part is equipped with cutting blades which, when the mould is closed, cut off projecting parts of the material placed in the mould.

In carrying out the production process, the layers and/or strata and/or films intended for the structural element are first placed one on top of the other to form a stack outside the mould. The stack is then placed in the mould, the gas-permeable padding layer being arranged adjacent to the mould part which has the channels, and the solid supporting layer being arranged adjacent to the mould part which may, if desired, have a relief-like structure. When the mould is subsequently closed, laterally projecting edges of the stack or individual layers of the stack are cut off, and the flexible padding layer is pressed against the rigid supporting layer and compacted. Thereafter, the two mould parts are heated to a temperature at which the material of the supporting layer softens, and compressed air is passed into the mould cavity and acts through the padding layer on the supporting layer and presses the latter against the adjacent mould part, the compacted padding layer relaxing. As soon as the shaping of the supporting layer is complete and the other layer or other layers have been sufficiently heated to effect adhesion at least to the adjacent surfaces, the mould parts are cooled and, after the individual layers have hardened, the mould is opened and the finished structural element is removed.

With correct choice of the materials used and processing of the inner surfaces of the mould, fashioning of the surfaces and of the edge of the structural element is not necessary.

In a variant of the production process described, a stack which has been heated beforehand and comprises softened and at least partially bonded layers is placed in the preheated mould, the latter is closed and the layers are moulded, after which the mould is cooled in order to solidify the compression moulded structural element.

It is assumed that the skilled worker is familiar with the setting of the variable parameters of the production process, in particular the heating temperature, the moulding time and the pressure of the compressed air, as a function of the number, the dimensions and the arrangement of the individual layers and as a function of the material used for these layers. Typical values are a heating temperature of 150–200°, a moulding time of 1–5 minutes and an air pressure between 1.5 and 20 bar, preferably between 3 and 12 bar.

Furthermore, the mould part adjacent to the supporting layer preferably has channels through which the enclosed air can escape when the supporting layer is pressed against the said mould part. It is also possible for some of the channels in the mould part adjacent to the padding layer to be used as air extraction channels, these extraction channels being connected to a line with an adjustable flow resistance, which makes it possible to set the working pressure with compressed air flowing continuously through the mould cavity. Finally, it is also possible to dispense with the passage of compressed into the mould cavity and instead to distribute in the porous padding layer or the supporting layer a substance which vaporises, reacts or decomposes at the working temperature and thus liberates sufficient gas to build up the required pressure in the mould cavity.

We claim:

1. A noise-reducing structural element, consisting essentially of a first layer being a noise-absorbing and thermally insulating layer selected from a group consisting of thermoformed fiber and a foam which is at least partially open-cell, and a second layer being a sound-insulating layer adjacent thereto and with a surface of one layer adjacent a surface of the other layer, the adjacent surfaces of the two layers being bonded to one another at least at spaced locations, said second layer comprising rigid, impermeable, thermoformed, synthetic, and self-supporting material, and said second layer supporting said first layer.

2. A structural element according to claim 1, and further comprising a heat-sealable adhesive layer between the first and the second layers.

3. A structural element according to claim 1, wherein the second layer is a glass fiber-reinforced plastic material.

4. A structural element according to claim 1, wherein the first layer is a fiber mat which is at least partially bonded with a thermoplastic binder, and the second layer consists of a thermoplastic material reinforced with glass fibers.

5. A structural element according to claim 4, wherein said binder is applied as a fiber or powder.

6. A structural element according to claim 4, wherein said thermoplastic material is selected from a group consisting of polypopylene, polyamide and polyester.

7. A structural element according to claim 4, wherein the glass fiber-reinforced material of the second layer is a cured sheet moulding compound.

8. A structural element according to claim 1, wherein the second layer consists of a thermoplastic material and a mineral filler and has a density between 1.5 and 2.5 kg/l.

9. A structural element according to claim 1, and further comprising a porous or microporous decorative layer bonded on the outer surface of the first layer.

10. A structural element according to claim 1, said second layer having recesses in the surface thereof remote from said second layer.

11. A structural element according to claim 10, and further comprising a thermoformed carpet joined to said first layer.

12. A structural element according to claim 1, wherein said second layer contains a heat-setting, crosslinked material.

13. A structural element according to claim 12, wherein the second layer contains at least one stratum of a bonded fiber material.

14. A structural element according to claim 1, wherein the second layer consists of vulcanized rubber.

15. A structural element according to claim 1, wherein the first layer is a fiber mat formed from synthetic fibers bonded with a heat-setting, crosslinked binder.

16. A structural element according to claim 15, wherein said binder is selected from the group consisting of a phenol resin, urea resin, melamine resin, epoxy resin or a mixture of two or more of said resins.

17. A structural element according to claim 1, wherein the first layer consists of a polyurethane foam.

* * * * *